United States Patent [19]

Valentine

[11] Patent Number: 5,778,408
[45] Date of Patent: Jul. 7, 1998

[54] CACHE ADDRESSING MECHANISM THAT ADAPTS MULTI-DIMENSIONAL ADDRESSING TOPOLOGY

[75] Inventor: Robert Valentine, Haifa, Israel

[73] Assignee: Intel Corporation, Santa Clara, Calif.

[21] Appl. No.: 691,451

[22] Filed: Aug. 2, 1996

Related U.S. Application Data

[63] Continuation of Ser. No. 158,648, Nov. 29, 1993, abandoned.

[51] Int. Cl.⁶ .................................................. G06F 12/00
[52] U.S. Cl. ............................................................. 711/3
[58] Field of Search .......................... 395/401, 403, 395/455; 711/1, 3, 128

[56] References Cited

U.S. PATENT DOCUMENTS

| | | | |
|---|---|---|---|
| 4,215,402 | 7/1980 | Mitchell et al. | 711/316 |
| 4,433,389 | 2/1984 | York et al. | 711/316 |
| 4,550,367 | 10/1985 | Hattori et al. | 711/5 |
| 4,774,659 | 9/1988 | Smith et al. | 711/208 |
| 5,133,061 | 7/1992 | Melton et al. | 711/128 |
| 5,179,680 | 1/1993 | Colwell et al. | 711/125 |
| 5,392,410 | 2/1995 | Liu | 711/3 |

OTHER PUBLICATIONS

Liu, "XOR Randomization in Cache Congruence Class Indexing" IBM Technical Disclosure Bulletin, vol. 27, No. 2 Jul. 1984, p. 1097.

*Primary Examiner*—Jack A. Lane
*Attorney, Agent, or Firm*—Blakely, Sokoloff, Taylor & Zafman

[57] ABSTRACT

A cache addressing mechanism particularly useful for a data cache used with a floating point processor for spreadsheet calculations where the spreadsheet program has column and row address fields in a single address. The most active bits in the column and row address fields are hashed to provide set selection bits. The most significant bit of the most active bits of one field is exclusively ORed with the least significant bit of the most active bits of the other field as part of the hashing.

5 Claims, 3 Drawing Sheets

CACHE ADDRESSING MECHANISM THAT ADAPTS MULTI-DIMENSIONAL ADDRESSING TOPOLOGY

This is a continuation of application Ser. No. 08/158,648, filed Nov. 29, 1993, now abandoned.

BACKGROUND OF THE INVENTION

1. Field of the Invention

The invention relates to the field of cache addressing, particularly where the address is multi-dimensional.

2. Prior Art

Cache memories are widely used with microprocessors. Typically cache memories include an array for storing data or instructions and a tag array for storing the tag fields of the addresses so that an association may be made between an address and the data in the cache. Additionally, a set selection is made by some predetermined number of address bits to select one or more tag fields since the typical cache memory is not fully associative. Cache memories often provide for two-way or four-way associativity to compensate for the flexibility lost from having set selection. Thus, even where the bits used for set selection remain constant, more than a single "hit" can occur.

Hashing of active fields in an address to spread data is known in the art. U.S. Pat. No. 4,736,287 is an example where the line address for a memory is hashed to provide a wide dispersal or mapping of more frequently used addresses thereby reducing the probability of collision.

As will be seen, the present invention uses hashing to create dispersal in a cache memory through the set selection mechanism.

SUMMARY OF THE INVENTION

An improved method for use with a cache memory having a tag array and a set selection mechanism is described. The method is particularly useful in multi-dimensional addressing such as frequently occurs in spreadsheet programs. In the currently preferred embodiment, the most active bits of the column, row and sheet address are hashed together through exclusive ORing. The results of this hashing is used for selecting sets in the two-way associative cache memory. The tag array in the memory stores the entire address, including the most active bits in the address.

DETAILED DESCRIPTION OF THE PRESENT INVENTION

A cache addressing mechanism, particularly suitable for use with a spreadsheet computer program is described. In this application, numerous specific details are set forth, such as the specific number of bits, etc. in order to provide a thorough understanding of the present invention. It will be obvious, to one skilled in the art, that the present invention may be practiced without these specific details. In other instances, well-known structures, such as the internal workings of a cache memory, are not shown in detail in order to not unnecessarily obscure the present invention.

Figure 2:
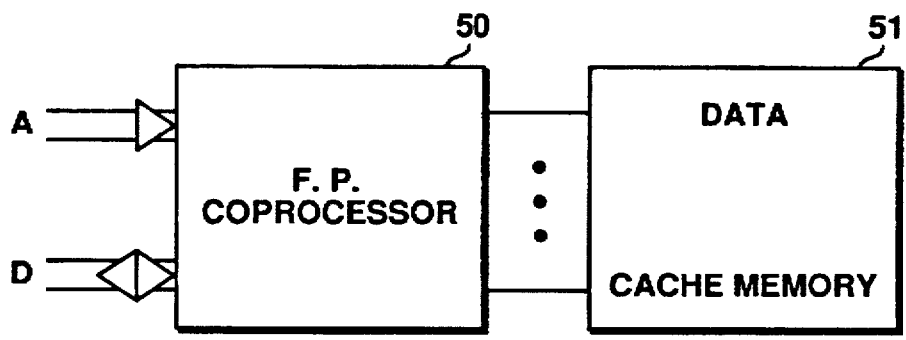
FIG. 2 is a block diagram used to show the environment in which the currently preferred embodiment of the present invention is used.

First, referring to FIG. 2, a floating point coprocessor 50 is shown. Such coprocessors are widely used to speed up floating point computations. Spreadsheet programs require numerous floating point computations and thus these programs can make excellent use of a floating point coprocessor.

To further enhance the performance of a coprocessor, a separate data cache memory 51 may be used. This data cache memory may be in addition to the data cache memory and instruction cache memory used by a processor associated with coprocessor 50.

An ordinary data cache memory, even if two or four-way associative, is not particularly useful for some spreadsheet programs. The reason for this can best be understood from FIG. 1. In some spreadsheet programs, multi-dimensional addressing is used; for instance, for a 32-bit address, 16 bits 40 may be used as an address for column data and 16 bits 41 may be used to address row data. Examining histograms of address activity for spreadsheet programs reveals that some spreadsheets are "row-based", some are "column-based" and some are "mixed-based". In the first histogram of FIG. 1, the addressing activity 42 shows a row-based spreadsheet where the least significant bits of the row address are frequently used. In the next histogram of FIG. 1, column address bits 43 and row address bits 44 are again shown. The activity 45 shows high bit activity for the least significant bits of the column address, thus symbolizing a column-based spreadsheet. Finally in FIG. 1, mixed-bit activity is shown with activity 48 of the column address bits 46 and activity 49 of the row bits 47. Again, however, the activity is generally in the least significant bits of the addresses.

Figure 1:
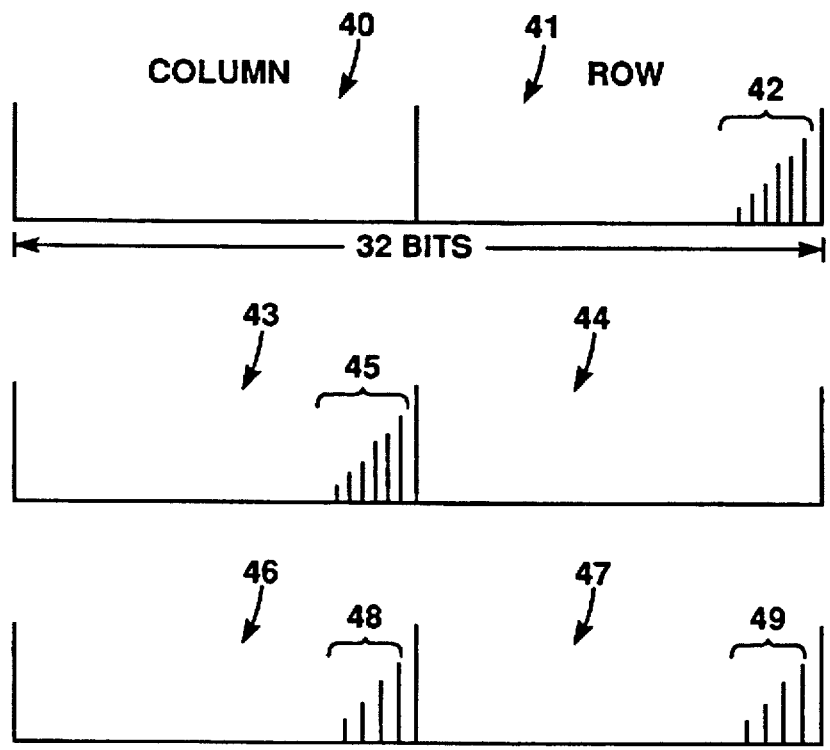
FIG. 1 illustrates three histograms for multi-dimensional addressing.

The examples shown in FIG. 1 demonstrates only two dimensions (column and row). Often there is a third dimension for "sheet".

If a data cache memory 51 of FIG. 2 is used to store the data for the addresses shown by the histograms of FIG. 1, very poor cache utilization will result. For example, if the set selection bits include the least significant bit of the column address, poor cache utilization results with a row-based spreadsheet.

With the present invention, hashing of the active bits is used to provide set selection bits thereby causing a spreading of the data throughout the cache memory. More specifically, the most active bits from the row, column and sheet address are exclusively ORed together.

Figure 5:
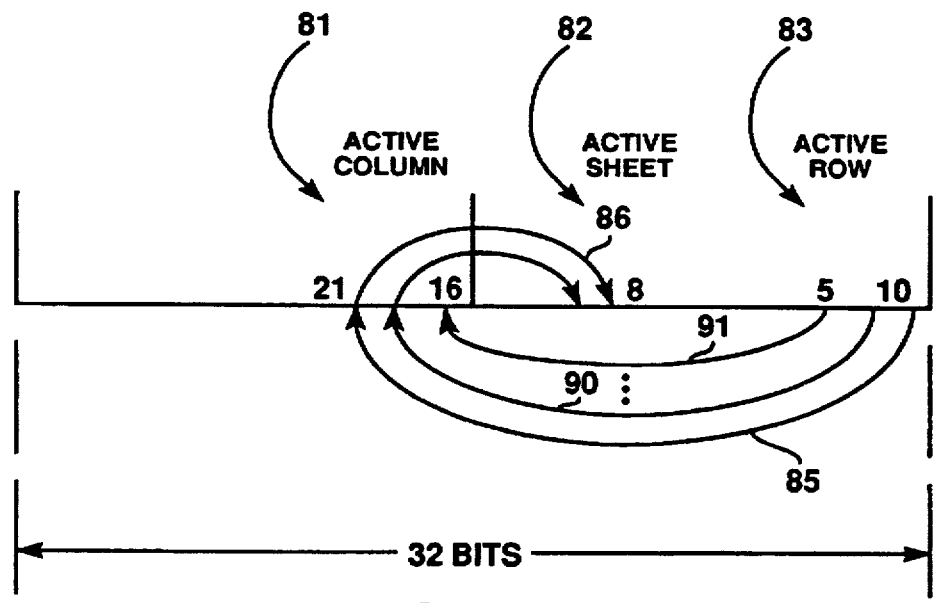
FIG. 5 is a diagram used to describe the hashing algorithm implemented with the present invention.

The algorithm that is used exclusively ORs the least significant of the most active bits from one field with the most significant of the most active bits from another field. This is shown in FIG. 5. Active column bits 81, active sheet bits 82 and active row bits 83 are shown in FIG. 5. The least significant bit of the active row bits is exclusively ORed with the most significant bit of the active column bits as shown by line 85. The result of the operation is exclusively ORed with the least significant bit of the active sheet bits as shown by line 86. The next bit (moving to a bit of more significance) of row address is exclusively ORed with the next bit (moving to a bit of lesser significance) of the column address as indicated by line 90, and so on. Finally, the most significant bit of the most active row address is exclusively ORed with the least significant bit of the column address as indicated by line 91. The result of this operation is exclusively ORed with the most significant bit of the active sheet address bits. As will be seen later, this provides very good disbursement of data for the mixed-based spreadsheets. The specific bits used in the currently preferred embodiment are shown in FIG. 3.

Figure 3:
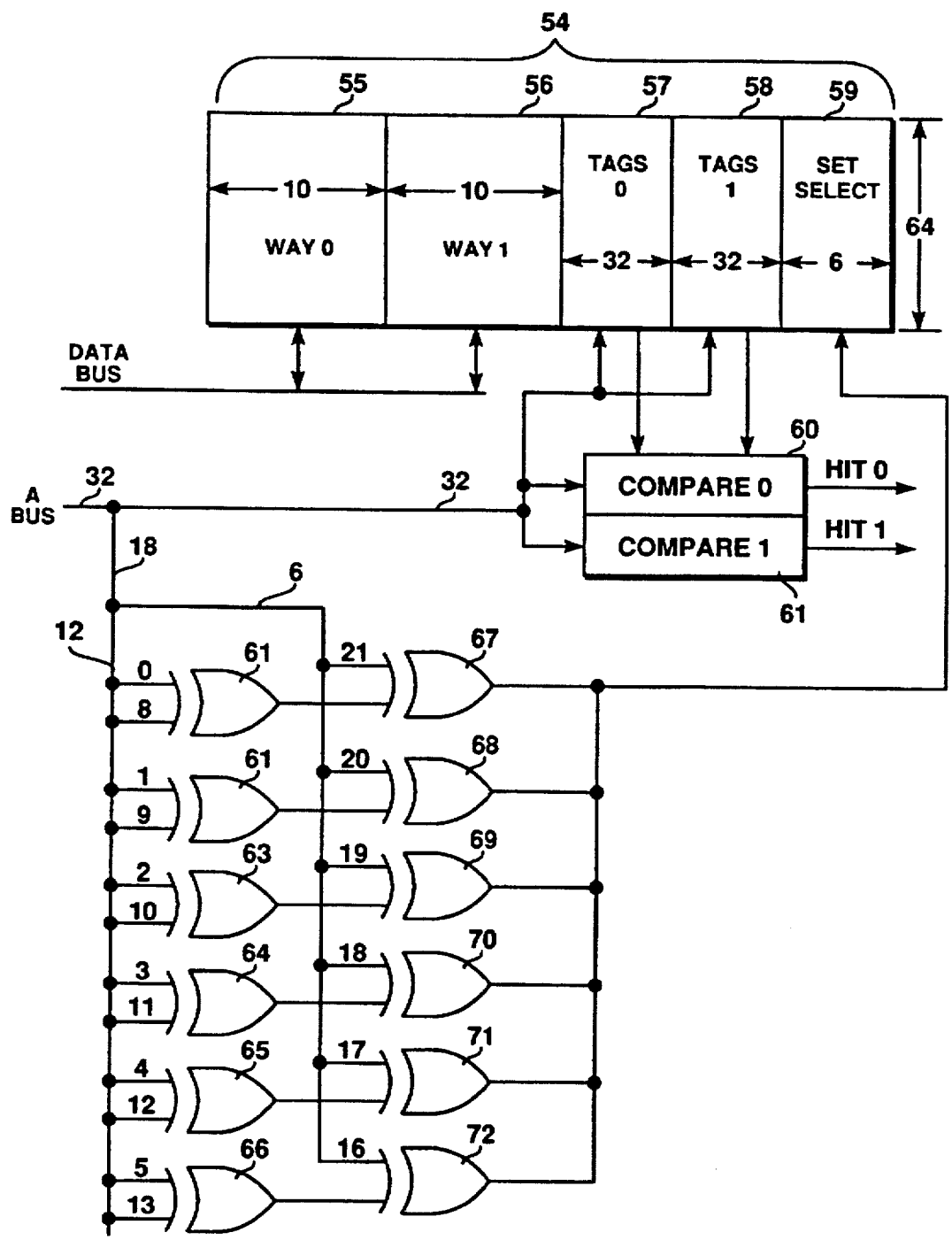
FIG. 3 is an electrical schematic and block diagram of the presently preferred embodiment of the present invention.

Referring now to FIG. 3, a cache memory 54 is shown which may be of ordinary construction except as mentioned below. Data is stored in two arrays, 55 and 56. The memory is two-way associative, this is indicated by "WAY 0" and "WAY 1". The data, intended to be used in a spreadsheet computer program, is 10 bytes wide. There are two tag storage arrays, 57 and 58, the tags in array 57 are used for selecting the data from array 55, and similarly, the tags in array 58 select data in array 56. As will be described, even though some bits of the address are used for set selection, the entire address of 32 bits is stored for each tag. There is a set selector 59 which, in the currently preferred embodiment, is 6 bits wide. Consequently, when reading data from the memory for each 6 bits applied to set selector 59, two tags are selected. One tag is coupled to the comparator 60 and the other to a comparator 61. There the tags are compared with the address on the address bus 32, and if a hit occurs in either comparator, the associated data for that tag from array 55 or 56 is coupled to the data bus.

All 32 address bits of the address bus, as illustrated in FIG. 3, are coupled to the comparators and to the tag arrays. 18 bits of the address are also coupled to exclusive OR gates 61 through 72 to provide the hashing discussed above. These 18 bits of the address are the most active bits for the column, row and sheet address fields. The exclusive OR gate 61 receives bits 0 and 8, gate 62 receives bits 1 and 9, gate 63 receives bits 2 and 10, gate 64 receives bits 3 and 11, gate 65 receives bits 4 and 12 and gate 66 receives bits 5 and 13. The output of the gate 61 provides one input to the exclusive OR gate 67, the other input to the gate is bit 21. Similarly, the gate 68 receives the output of gate 62 and bit 20, gate 69 receives the output of gate 63 and bit 19, gate 70 receives the output of gate 64 and bit 18, gate 71 receives the output of gate 65 and bit 17 and finally, gate 72 receives the output of gate 66 and bit 16. The outputs of the gates 67 through 72 (6 bits) are coupled to the set selector for selecting the two tag fields for reading, one from array 57 and the other from array 58. The output from the exclusive OR gates is also used to select a tag array location when the addresses are being loaded into the tag arrays. During loading only one tag array is selected at a time as is customarily done for multiple-way cache memories.

Figure 4:
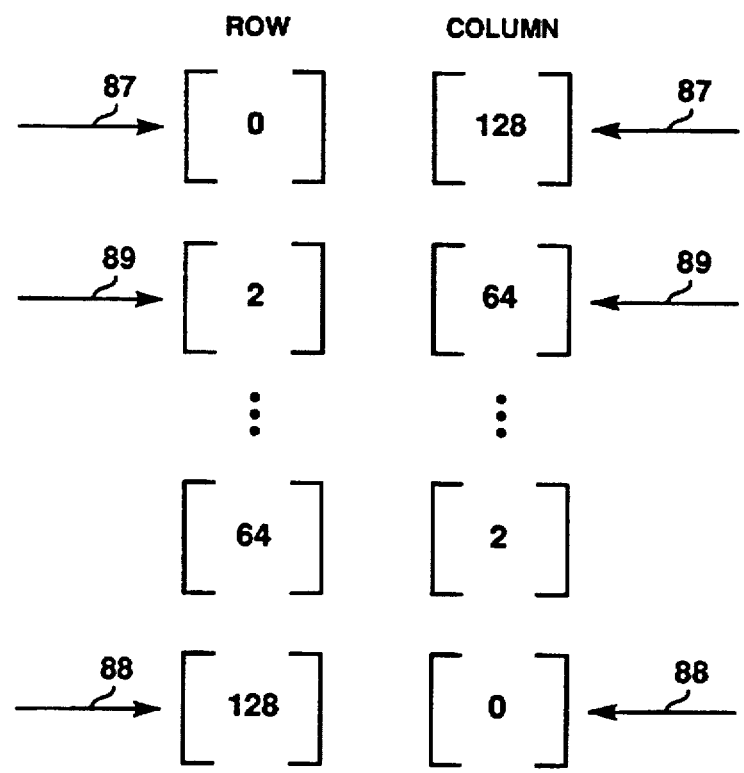
FIG. 4 is a listing of row and column address ranges used to describe the operation of the present invention.

Referring to FIG. 4, the arrangement of FIG. 3 guarantees that in a column-based program, where only the column addresses are changing, that a hit is possible in the cache memory for the entire address range of 0–127 (128 addresses). This is shown between the arrows 87 in FIG. 4. At the other extreme, shown between arrows 88, is the case where all the activity is confined to the least significant bits of the row address, specifically, bits 0 through 5. For this case an address range of 128 addresses is guaranteed by the combination of six address bits and two arrays (WAY 0 and WAY 1). If the program has mixed row and column activity, specifically, a row address range of 2 (0–1) and a column address range of 64 (0–63) then, as shown between lines 89, there will be full utilization of the cache memory, that is, a hit is possible for these entire ranges. Similarly, as the mix changes and becomes more row-based, there will be full utilization of the cache memory for a range of 64 on the row address and a range of 2 on the column address. As can be seen from FIG. 4, there is a minimum amount of cancellation of usable addresses that takes place for a mixed address spreadsheet. The reason for this is that the reversing of the row and column bits in the hashing, as shown in FIG. 5, minimizes the effect of cancellation, thus there is benefit to exclusive ORing the lesser toggled upper row address bits and the very most active lower column address bits and by exclusive ORing the lower, very active row address bits with the upper, less active column address bits.

Some spreadsheet programs may be more sheet oriented causing the bits that toggle the most to be shifted. This three dimensional case is shown in FIG. 5; this embodiment may be used both for a two dimensional and three dimensional oriented spreadsheet. The hashing shown in FIG. 5 not only adapts to different spreadsheet behavior but to different spreadsheet programs.

Thus, a method and apparatus for implementing a cache memory where multi-dimensional addressing is used has been described.

We claim:

1. A method for improving the operation of a spreadsheet computer program on a computer having a cache memory, the cache memory having a number of sets, each set having at least one location for storing data, where the program uses an address with a column field and a row field, the method comprising the steps of:

identifying n most active bits in the column field and n most active bits in the row field, where $2^n$ is the number of sets in the cache memory;

hashing together the n most active bits in the column field and the n most active bits in the row field to produce an n-bit set select word;

using the n-bit select word to select a set in the cache memory; and storing data in a location in the selected set in the cache memory.

2. The method defined by claim 1 including a step of storing the address including the n most active bits of the column field and the n most active bits of the row field in a tag array location corresponding to the cache memory location in which the data is stored.

3. The method defined by claim 2 wherein the hashing includes exclusive Oring of the least significant bit of the n most active bits of the column field with the most significant bit of the n most active bits of the row field.

4. A method for improving the operation of a spreadsheet computer program on a computer having a cache memory, the cache memory having a number of sets, each set having at least one location for storing data, where the program uses an address with a column field, a row field and a sheet field, the method comprising the steps of:

identifying n most active bits in the column field, n most active bits in the row field, and n most active bits in the sheet field, where $2^n$ is the number of sets in the cache memory;

hashing together the n most active bits in the column field, the n most active bits in the row field, and the n most active bits in the sheet field to produce an n-bit set select word;

using the n-bit select word to select a set in the cache memory; and storing data in a location in the selected set in the cache memory.

5. The method defined by claim 4 including a step of storing the address including the n most active bits of the column field, the n most active bits of the row field, and the n most active bits of the sheet field in a tag array location corresponding to the cache memory location in which the data is stored.

* * * * *